Nov. 25, 1952     R. R. LAMBERT     2,619,574
METAL FRAME JOINT AND METHOD OF MANUFACTURING SAME
Filed Aug. 1, 1947
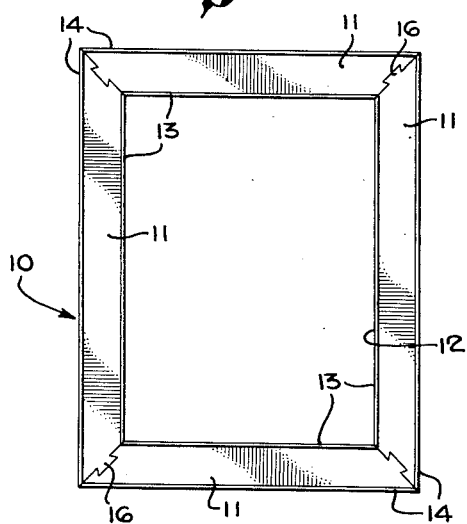
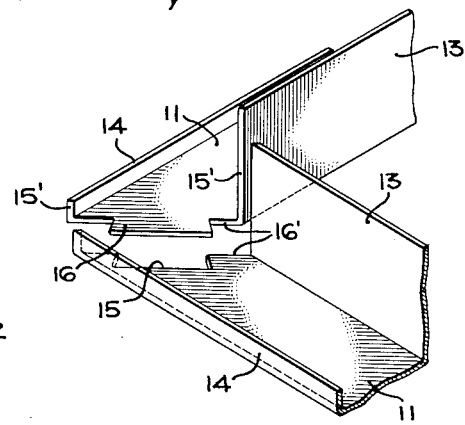
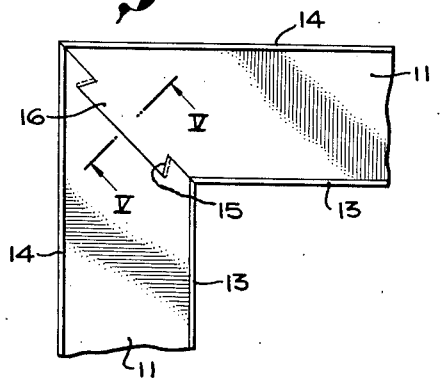
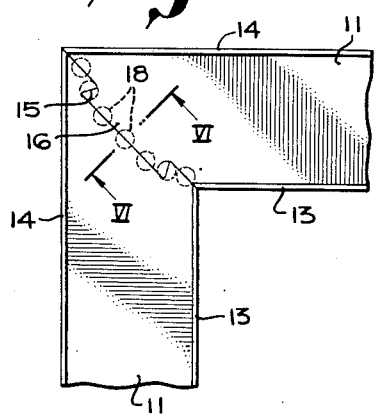
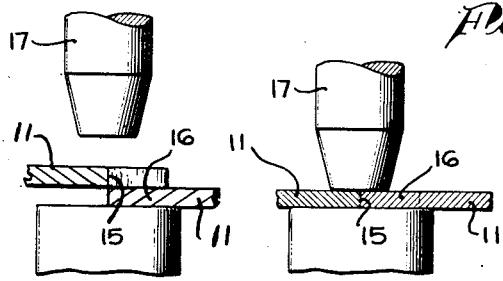
INVENTOR.
Robert R. Lambert
BY
ATTORNEY Patented Nov. 25, 1952

2,619,574

UNITED STATES PATENT OFFICE 2,619,574

METAL FRAME JOINT AND METHOD OF MANUFACTURING SAME

Robert R. Lambert, Los Angeles, Calif., assignor to Air-Factors, Inc., Los Angeles, Calif., a corporation of California Application August 1, 1947, Serial No. 765,423

2 Claims. (Cl. 219—10)

This invention relates to welded joints and the method of making the same. More specifically, this invention is especially adapted for making metal frames such as those used in the manufacture of air registers or grilles for use with heating and ventilating systems.

Metal frames for grilles etc., preferably include flat face portions and rearwardly extending flanges which hold the grille work or louvres and also act as spacers. Difficulty has been encountered in making such frames. The usual practice has been to use flat metal strips with ends cut square (at right angles to longitudinal edges), and weld the ends to side margins of adjacent strips to form the flat face portion of the grille frame, and then to laboriously weld additional strips in position to form the rearwardly extending flanges. These many welding operations require considerable time and are costly; the operation is not satisfactory because it is difficult to maintain the parts in proper relation and the finished frames are not strong, square and free from twist or warpage.

I have found that if strip metal angle iron is cut into the desired lengths by means of a die designed to shear the formed strips at an angle of 45°, the end edges of the flanged portions will be cut at the proper angles to effect a miter joint. I have also found that if the die is formed to provide a keyed or undercut recess in the end of one of the flat face portions and a key or projection in the cooperating end face portion, a substantial mechanical connection can be effected. In producing the mechanical connection, it is important that the key-shaped projection be slightly larger than its cooperating recess and it is further important that the recess be pressed over and into interlocking position with the projection during spot welding of the joint seam. The simultaneous spot welding and pressure connection of the recess and projection produces a weld of the adjacent end edges of the flat face portions of sufficient strength and rigidity to obviate the welding of the end edges of the flange portion, and since the end edges of the flange portion are mitered to fit snugly together, a neat and clean connection of the required strength is obtained quickly and results in a great saving of time and material. Also, by providing the interlocking end connections, the length of the weld is increased and makes for a stiffening action which imparts rigidity to the connected members of the frame.

It is one object of this invention to provide a joint and the method of making the same wherein the members being joined are connected together by both a keyed mechanical and welded connections.

Another object is to provide an angular joint and the method of making the same wherein the ends of the members being connected are stamped to provide cooperating interlocking elements.

Another object is to provide a joint and method of making the same wherein the end edges of the members to be connected include cooperating edges disposed at an angle to other cooperating edges and means carried by certain of the cooperating edges arranged to be pressed into interlocking relation during the welding together of the cooperating edges.

Another object is to provide an angular joint and method of making the same wherein the members to be joined include a plurality of sides wherein certain cooperating end edges of the sides are mitered to fit opposing end edges and the unmitered sides having interlocking connections therebetween.

A further object is to provide a joint and method of making the same which consists in simultaneously welding and forming interlocking connections of the ends of the members being joined.

A still further object is to provide a joint and method of making the same wherein the seam of the weld is greater in length than the length of the end edges being connected, thereby providing a greater stiffening effect between the connected members.

Still another object is to provide a joint having the above characteristics that will be rigid, durable, neat in appearance, which will require a minimum amount of dressing, and which may be accomplished quickly and thereby greatly reduce the cost of making a joint.

The above and other objects will be made apparent throughout the further description of the invention when taken in connection with the accompanying drawings, wherein like reference characters refer to like parts. It is to be understood that the drawings are not a definition of the invention but merely illustrate an exemplary form by means of which the invention may be effectuated.

In the drawings:

Fig. 1 is a rear view in elevation of a frame embodying the invention.

Fig. 2 is a fragmentary exploded view of one corner of the frame illustrated in Fig. 1.

Fig. 3 is a plan view of Fig. 2 showing the ends of the members to be joined in position for the connecting operation.

Fig. 4 is a view similar to Fig. 3 illustrating a completed joint.

Fig. 5 is a sectional view taken along line V—V of Fig. 3.

Fig. 6 is a sectional view taken along line VI—VI of Fig. 4.

Referring to the drawings, the numeral 10 indicates a frame in its entirety consisting of side members and end members forming a rectangular frame. Each of the side members and end members includes a flat face portion 11. The flat portions 11 define an air opening 12. The inner edges of the face portions 11 terminate in rearwardly extending flanges 13 and the outer edges of the face portions 11 terminate in rearwardly extending flanges 14. The flanges 13 which are usually disposed at substantially right angles to the plane of the face plates 11 are of greater depth than the flanges 14 and are employed as a mounting structure for grille bars. The outer flanges 14 are employed as a finishing and spacing member for spacing the frame 10 a predetermined distance from a wall in which the register or grille is mounted. The flanges 13, being of greater depth, extend into an opening provided in the plaster or wall and connect with the air or gas passageway feeding air or gas through the opening 12 by way of the grille bars, not shown.

In constructing the frame 10 the side and end members are cut from a preformed strip of material providing the face plate 11 and flanges 13 and 14. The preformed strip of material is passed beneath a die which is formed in substantially a V-shape of 90°. One side of the die is arranged to shear the flanges 13 and 14 and the face along a 45° shear line 15' including a wedge-shaped opening 15, while the other side of the die is arranged to shear the flanges 13 and 14 and the face 11 along a 45° shear line 16' and simultaneously provide a wedge-shaped projection 16 in the face 11. The wedge-shaped projection 16 is very slightly greater in dimensions than the opening 15. The die being of substantially right angle shape provides cooperating end edges to the face plate members 11 and flanges 13 and 14 along shear lines 15' and 16' to permit the two pieces to be brought together and form a right angle, as clearly depicted by the drawings.

In connecting cooperating end edges of the frame members, it is of importance that the end of the face plate 11 provided with the recess 15 be positioned in abutting relation with the cooperating member carrying the projection 16 so that the recess 15 will rest upon the slightly greater projection 16 in the position as illustrated in Figs. 3 and 5. A combination pressure and spot welding machine is employed for effecting the connection. The pressure electrodes are clearly shown in Figs. 5 and 6. Upon operating the welding machine, the pressure electrode 17 presses and springs the opening 15 about the cooperating edges of the projection 16 in a wedge-like manner during the spot welding operation. Fig. 6 shows the projection 16 in interlocking relation with the recess 15. The welding machine operates automatically from an actuating pedal and as many spot welds as desired may be rapidly obtained, such as those illustrated at 18 in Fig. 4. The key 16 and recess 15 act to properly center the pieces being welded. The undercut shape of the key 16 tends to draw edges 15' and 16' together during welding.

Since the flanges 13 and 14 are sheared at an angle, the end edges of the cooperating flanges are mitered so that they will rest in close, abutting relation. It has been found that with the present method of connecting the two ends to form a joint, it is only necessary to weld the seam between the abutting edges 15' and 16' of the face 11. Also, the interlocking projection 16 with the recess 15 provides a weld of greater length than the length of the end edges being welded and at an angle to edges 15' and 16'. This greater length of the weld, in addition to the mechanical, keyed, interlocking connection of the projection and recess, effects a stiffening action, the combination of which provides a connection between the opposing edges of the face plate 11 of sufficient rigidity and strength as to obviate the necessity of welding the abutting mitered edges of the flanges 13 and 14, thereby greatly reducing the time and material for effecting a joint of the required strength. Also, by mitering the abutting edges of the flanges 13 and 14 and connecting the abutting edges of the face plates, a neat and smooth weld is obtained and very little grinding and finishing is required to produce a clean, finished joint.

Fig. 5 shows the position of the abutting edges of members to be joined prior to the pressure and welding operation, and Fig. 6 shows the position of the members after the pressure and welding operation has been applied to the joint.

Accordingly, there is provided a joint and method of making the same that may be accomplished with a minimum of operations which provides a connection possessed of both the strength of a welded connection and a mechanical interlocking connection. The joint is strong, durable, neat in appearance, and may be accomplished effectively and quickly and thereby provides a method of making a joint in such a manner that will greatly reduce the over-all cost in the manufacture of frames or other articles where joints are required.

While I have illustrated and described one form of a joint embodying the invention and the method of producing the same, it will now be apparent to those skilled in the art that the projection and its cooperating recess may be greater or less than that illustrated in the drawings. Other changes, substitutions, and modifications may be made in the exemplary form herein illustrated without departing from the spirit and scope of the appended claims.

I claim:

1. A method of twist free joining of two flanged members at an angle, one to the other, each member having a flat face portion to be joined in a common plane and a flange portion, the steps of: simultaneously shearing and stamping an end of one member to form a mitered end on the flange portion and a recess in the associated adjacent flat face portion; simultaneously shearing and stamping the other member to form a complementary mitered end on its flange portion and a projection in the associated adjacent flat face portion slightly larger than said recess and of similar configuration; positioning the mitered ends in abutting relation with the recess of one flat face portion overlying the projection of the other flat face portion; and then pressing and springing the edge margins of the recess over the projection while simultaneously and progressively welding the edge margins of the recess and projection.

2. A method of joining two flanged members at an angle, one to the other, which consists of the steps of simultaneously shearing and stamping an end of one member to form a miter and to form a recess; simultaneously shearing and stamping an end of the other member to form a miter and a projection slightly larger than said recess and of similar configuration; placing the ends to be joined in abutting relation with the recess above the projection; and then pressing and springing the edge margins of the recess into the same planar zone as the edge margins of the projection while simultaneously and progressively welding the edge margins of the recess and projection.

ROBERT R. LAMBERT.

REFERENCES CITED

The following references are of record in the file of this patent:

UNITED STATES PATENTS

| Number | Name | Date |
| --- | --- | --- |
| 1,093,207 | Ryan | Apr. 14, 1914 |
| 1,158,307 | Schmidt | Oct. 26, 1915 |
| 1,357,156 | Von Eckermann | Oct. 26, 1920 |
| 1,524,261 | Kusterle | Jan. 27, 1925 |
| 1,639,109 | Putnam | Aug. 16, 1927 |
| 1,725,937 | Rosel | Aug. 29, 1929 |
| 1,773,063 | Vieneau | Aug. 12, 1930 |
| 2,049,528 | Stroud | Aug. 4, 1936 |
| 2,330,207 | England et al. | Sept. 28, 1943 |
| 2,335,754 | Grempler | Nov. 30, 1943 |
| 2,412,175 | Ridgway | Dec. 3, 1946 |
| 2,462,199 | Kehoe et al. | Feb. 22, 1949 |